Sept. 26, 1950      J. LARSEN ET AL      2,523,703
SYSTEM FOR TRANSMITTING SIGNAL MODULATED PULSES
Filed June 25, 1946      3 Sheets-Sheet 3
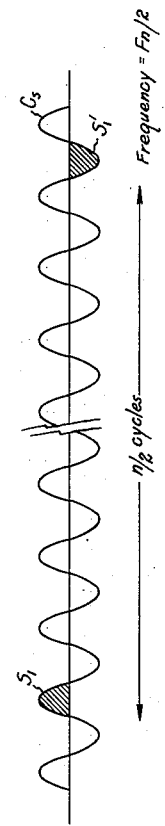
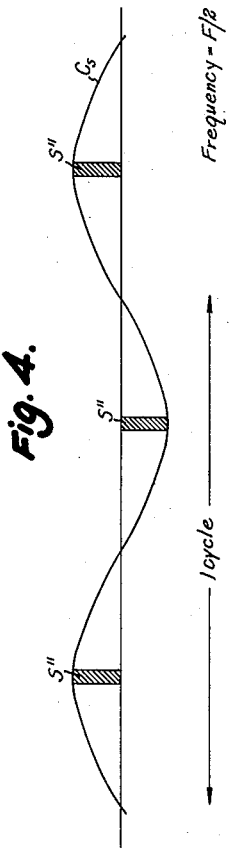
Inventors:
Jack Larsen
Robert B. Blizard
By Stowell + Evans
Attorneys.

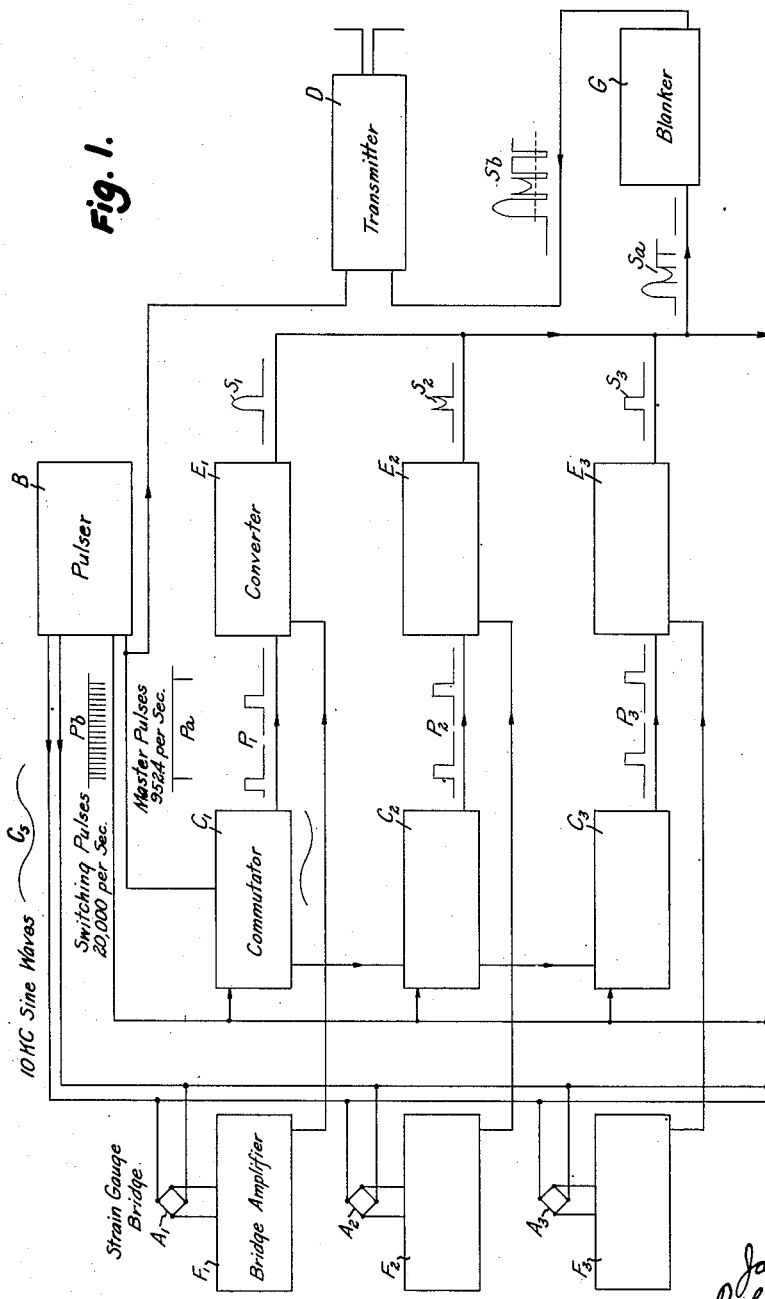

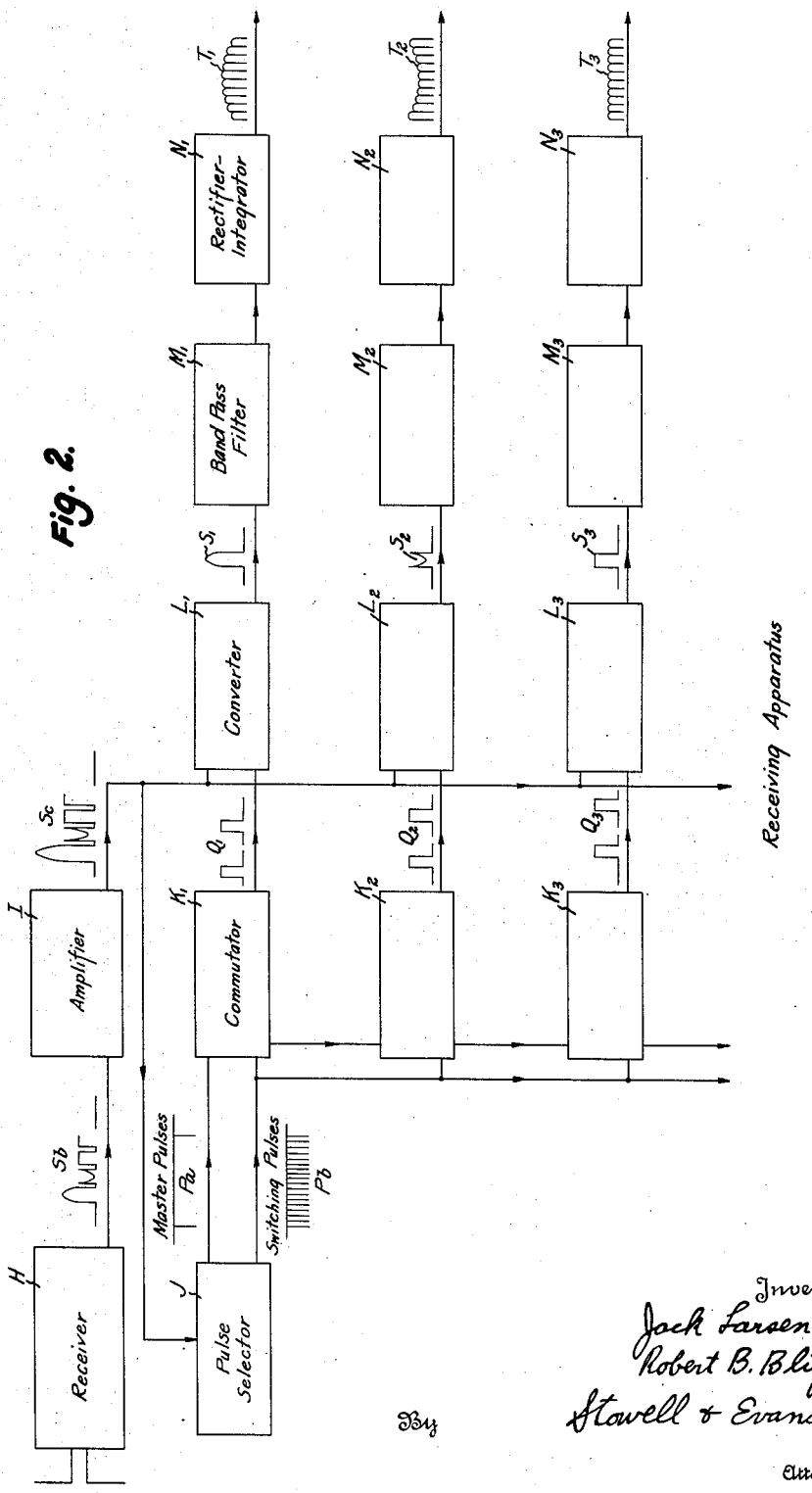

Patented Sept. 26, 1950

2,523,703

UNITED STATES PATENT OFFICE 2,523,703

SYSTEM FOR TRANSMITTING SIGNAL MODULATED PULSES

Jack Larsen, Jackson, Mich., and Robert B. Blizard, Boston, Mass., assignors to Research Corporation, New York, N. Y., a corporation of New York Application June 25, 1946, Serial No. 679,299

5 Claims. (Cl. 179—15)

This invention relates to the transmission and demodulation of intelligence-bearing signals and particularly to method and apparatus for demodulating signals received over a single channel from a plurality of intelligence sources.

An object of the invention is the provision of a method and apparatus for demodulating intelligence-bearing signals.

A further object of the invention is the provision of a method and apparatus for the demodulation of signals generated by the sampling of intelligence modulated alternating potentials at a frequency and phase correlated with the frequency of the alternating potentials.

In general, the invention comprises a method and apparatus whereby a signal, generated by sampling F times a second an amplitude modulated alternating potential having a frequency $mF/2$ where $m$ is an odd integer and having a fixed phase relation to the sampling periods, is demodulated by isolating from the signal a band of frequencies, not exceeding a band width F, centered at the frequency $m'F/2$ where $m'$ is an odd integer, preferably 1.

The method and apparatus of the invention are particularly useful in multi-signal transmission systems for transmitting data from a plurality of intelligence sources, such as instrument readings, strain gauge and accelerometer readings and the like, over a single channel and, for purpose of illustrating the principles of the invention, the invention will be more particularly described with reference to a system for the telemetering of aircraft flight data from a plurality of instruments to a ground station, more fully described in application Ser. No. 625,590 of Myron H. Nichols et al., filed Oct. 30, 1945, now Patent No. 2,444,950.

The present invention is particularly adapted for use in connection with multi-signal transmission systems in which the intelligence sources are energized by the method and apparatus described in application Ser. No. 632,578 of Lawrence L. Rauch, filed Dec. 3, 1945, now Patent No. 2,445,840.

In the application Ser. No. 632,578 of Rauch, there is described a method and apparatus for the transmission over a single channel of signals from a plurality of intelligence sources wherein the intelligence sources are connected in cyclic serial order with a common output channel at a preselected periodic sampling frequency F for sampling periods having a duration not exceeding $1/Fn$ where $n$ is the number of intelligence signals to be transmitted, and the intelligence sources are energized with a common alternating potential having a frequency not less than one-half F and, preferably, not more than $Fn$ and having a fixed phase relation to the sampling periods.

We have found that substantial advantages in transmission and reception of such signals may be attained by energizing the intelligence sources with an alternating potential having a frequency which is an odd integral multiple of one-half the sampling frequency (including one-half the sampling frequency), and in isolating from the received signal a band of frequencies not exceeding the sampling frequency in band width and centered at a frequency which is an odd integral multiple of one-half the sampling frequency (including one-half the sampling frequency).

The desired relation of the frequency of the energizing potential to the sampling frequency may be obtained by energizing the intelligence sources with an alternating potential having a frequency of one-half the sampling frequency F. The desired relation may also be obtained with an odd number of intelligence channels if the sampling pulse duration is equal to or less than one-half the period of the energizing potential and is in phase therewith. In both of these methods, the intelligence channels are alternately sampled during positive and negative half cycles, of "up and down," so that D. C. components are not introduced into the signal to be transmitted.

The multi-signal transmission system specifically described herein includes an electronic commutator adapted to connect in cyclic serial order a plurality of intelligence channels with a single output channel for radio transmission to a receiver which may include a similar commutator adapted to connect the received signals in corresponding cyclic serial order to a plurality of indicating and/or recording devices through suitable demodulating devices in accordance with the principles of the invention.

The electronic commutator preferably comprises a plurality of electronic tube switch circuits corresponding in number to the signal channels to be sampled, the first switch circuit of the commutator being actuated by a master pulse at the beginning of each switching cycle and the successive switch circuits being actuated by switching pulses corresponding to the number of the signal channels.

The periodic pulses are passed from each of the switch circuits to a modulator whereby the corresponding intelligence channel is connected with the common transmission channel of the system during the duration of a pulse, thereby, in effect, modulating each pulse with the intelligence signal. The modulator or converter may comprise a triode, to the plate of which an intelligence signal is applied and to the grid of which periodic positive pulses are applied whereby the intelligence signal is passed by the triode for the duration of the pulse.

The invention will be more particularly described with reference to the accompanying drawings showing an illustrative embodiment of the invention.

In the drawings:

Fig. 1 is a block diagram of a multi-signal transmitter embodying the principles of the invention;

Fig. 2 is a block diagram of a receiving system adapted to segregate and demodulate, in accordance with the principles of the invention, the signals transmitted by the transmitter of Fig. 1;

Fig. 3 is a diagrammatic representation of the relations between the source energizing voltage and the sampling pulses in one embodiment of the invention, and Fig. 4 is a diagrammatic representation of the relations between the source energizing voltage and the sampling pulses in another embodiment of the invention.

The transmission system

A typical airborne transmission system is shown diagramatically in Fig. 1. It operates at a sampling frequency F of 952.4 per second. Twenty-one signal channels, $n$, are provided for transmission of signals from twenty-one strain gauge bridges $A_1$, $A_2$ . . . distributed at critical points on the aircraft. The switching frequency or pulse frequency, $Fn$, is therefore 20,000 per second.

The pulse generator B provides a 10 kc. sine wave $Cs$ to drive the strain gauge bridges. It also provides master pulses $Pa$ at 952.4 per second which are fed to the first switch circuit $C_1$ of the commutator, as well as to the transmitter D, and switching pulses $Pb$ at 20,000 per second which are fed to the commutator switch circuits $C_1$, $C_2$ . . .

Corresponding to each strain gauge bridge there is a converter circuit $E_1$, $E_2$ . . . to which the segregated signal pulses $P_1$, $P_2$ . . . are fed from the corresponding switch circuits of the commutator at the rate of 952.4 per second. The signals from the strain gauge bridges, amplified by the associated amplifiers $F_1$, $F_2$ . . . , are fed to the corresponding converters and emerge as modulated pulses $S_1$, $S_2$ . . . , having a frequency of 952.4 per second and a pulse duration of $1/20{,}000$ of a second.

The modulated pulses $Sa$ are fed to the blanker G which broadens and clips the switching pulses and inserts them in the signal. The modulated pulses $Sb$ are then supplied to the transmitter D.

The receiving apparatus

A suitable form of receiving apparatus is shown in block diagram in Fig. 2. It comprises a receiver H suitable for the reception of the modulated signals transmitted by the transmitter. The received signal $Sb$ is fed to the amplifier. I and to the pulse selector J.

The amplified signal $Sc$ is fed to the converters $L_1$, $L_2$ . . . , which are similar in arrangement and function to the converters $E_1$, $E_2$ . . . , of Fig. 1. The master pulse $Pa$ from the pulse selector is supplied to the first trigger channel $K_1$ of the commutator, while the switching pulses $Pb$ are fed in common to all of the channels of the commutator. The commutator supplies timed pulses $Q_1$, $Q_2$ . . . serially to the converters in synchronism with the individual modulated pulses from the amplifier I. These individual modulated pulses $S_1$, $S_2$ . . . are then fed to corresponding band pass filters $M_1$, $M_2$ . . .

The band pass filters $M_1$, $M_2$ . . . are selected to pass a frequency which is an odd integral multiple of one-half the sampling frequency, preferably one-half the sampling frequency, together with modulation side bands, not exceeding a total band width equal to the sampling frequency F, 952.4 frequencies in the specific example. The signals from the band pass filters go to rectifier-integrators $N_1$, $N_2$ . . . wherein the signals are rectified and grouped to form integrated signals $T_1$, $T_2$ . . . , having wave forms corresponding to the variations in the data of the instruments $A_1$, $A_2$ . . . of Fig. 1.

In the method and apparatus particularly described with reference to Figs. 1 and 2, the duration of the positive pulses $P_1$, $P_2$ . . . from the commutators is exactly one-half the period of the 10,000 cycle bridge driving frequency, and the pulses are phased so that the sampling starts when the bridge driving voltage is approximately zero and stops when the voltage is again approximately zero a half period later. Thus, since there are an odd number of bridge signal channels, twenty-one in the specific example, each bridge signal is sampled for half a cycle every ten and one-half cycles, as shown in Fig. 3 wherein $Cs$ represents the instrument signal and the sampling periods $S_1$, $S'_1$ are shaded. The sampling pulses are thus alternately modulated "up and down" as is desired.

Fig. 4 shows a method of sampling wherein the intelligence sources are energized with an alternating potential having a frequency of one-half the sampling frequency F. The phase of the sinusoidal voltages in this method progresses from one intelligence source to the next so that each is sampled at a peak of the sinusoidal voltage, as shown as $S''$ in Fig. 4.

The method and apparatus of the invention make it possible to use a lower frequency for energizing the intelligence sources, eliminate the necessity for maintaining D. C. components throughout the transmission circuits, and make possible the utilization of wider frequency bands thus imposing less stringent demands on the filters and making possible the transmission of more intelligence in the signals.

The method and apparatus of the invention may be varied widely without departing from the principles of the invention as defined in the claims hereof.

We claim:

1. A system for transmitting intelligence which comprises means providing periodic pulses having a frequency F, means providing an alternating potential having a frequency $mF/2$, where $m$ is an odd integer, an intelligence source, means for modulating said alternating potential by said intelligence source to provide a signal, means for modulating said periodic pulses with said signal, means for transmitting said modulated pulses, and receiving means including a band pass filter passing a band of frequencies not exceeding a band width of F frequencies centered at the frequency $m'F/2$, where $m'$ is an odd integer.

2. A system for transmitting intelligence which comprises means providing periodic pulses having a frequency F, means providing an alternating potential having a frequency $mF/2$, where $m$ is an odd integer, an intelligence source, means for modulating said alternating potential by said intelligence source to provide a signal, means for modulating said periodic pulses with said signal, means for transmitting said modulated pulses, and receiving means including a band pass filter passing a band of frequencies not exceeding a band width of F frequencies centered at the frequency $m'F/2$, where $m'$ is an odd integer, and means for rectifying the signal passed by said band pass filter.

3. A system for transmitting intelligence which comprises means providing periodic pulses having a frequency F, means providing an alternating potential having a frequency $mF/2$, where $m$ is an odd integer, an intelligence source, means for modulating said alternating potential by said intelligence source to provide a signal, means for modulating said periodic pulses with said signal, means for transmitting said modulated pulses, and receiving means including a band pass filter passing a band of frequencies not exceeding a band width of F frequencies centered at the frequency $F/2$.

4. A system for transmitting over a single channel signals from a plurality of intelligence sources comprising means providing periodic pulses having a frequency $Fn$ where F is the rate at which the signal from each intelligence source is to be sampled and $n$ is a whole number not less than the number of intelligence sources to be sampled, means providing a common alternating potential having a frequency of $mF/2$, where $m$ is an odd integer, a plurality of intelligence sources, means for modulating said alternating potential by said intelligence sources to provide a signal corresponding to each source, means for modulating said periodic pulses in cyclic serial order with said signals, means for transmitting said modulated pulses, receiving means including means for segregating said modulated pulses into periods synchronic with said rate of sampling, and band pass filters isolating from the segregated signals a band of frequencies not exceeding a band width of F frequencies centered at the frequency $m'F/2$, where $m'$ is an odd integer.

5. A system for transmitting over a single channel signals from a plurality of intelligence sources comprising means providing periodic pulses having a frequency $Fn$ where F is the rate at which the signal from each intelligence source is to be sampled and $n$ is a whole number not less than the number of intelligence sources to be sampled, means providing a common alternating potential having a frequency of $mF/2$, where $m$ is an odd integer, a plurality of intelligence sources, means for modulating said alternating potential by said intelligence sources to provide a signal corresponding to each source, means for modulating said periodic pulses in cyclic serial order with said signals, means for transmitting said modulated pulses, receiving means including means for segregating said modulated pulses into periods synchronic with said rate of sampling, and band pass filters isolating from the segregated signals a band of frequencies not exceeding a band width of F frequencies centered at the frequency $F/2$.

JACK LARSEN.
ROBERT B. BLIZARD.

REFERENCES CITED

The following references are of record in the file of this patent:

UNITED STATES PATENTS

| Number | Name | Date |
|---|---|---|
| 1,361,488 | Osborn | Dec. 7, 1920 |
| 2,048,081 | Riggs | July 21, 1936 |
| 2,199,634 | Koch | May 7, 1940 |
| 2,273,193 | Heising | Feb. 17, 1942 |
| 2,380,982 | Mitchell | Aug. 7, 1945 |
| 2,395,467 | Deloraine | Feb. 26, 1946 |
| 2,410,350 | Labin et al. | Oct. 29, 1946 |